United States Patent
Abe (10) Patent No.: US 6,798,455 B1
(45) Date of Patent: Sep. 28, 2004

(54) IMAGE PICKUP APPARATUS HAVING A COMMON CIRCUIT PORTION FOR AUTOFOCUSING AND OUTLINE EMPHAZISING CIRCUITS

(75) Inventor: Miki Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/600,372

(22) PCT Filed: Nov. 17, 1999

(86) PCT No.: PCT/JP99/06406
§ 371 (c)(1),
(2), (4) Date: Jul. 14, 2000

(87) PCT Pub. No.: WO00/29893
PCT Pub. Date: May 25, 2000

(30) Foreign Application Priority Data

Nov. 18, 1998 (JP) .......................................... 10-327801

(51) Int. Cl.[7] .............................................. H04N 5/232
(52) U.S. Cl. ...................... 348/353; 348/355; 348/356
(58) Field of Search ........................ 348/345, 348–351, 348/353–356; 396/79, 96; 382/254, 255, 263, 266

(56) References Cited

U.S. PATENT DOCUMENTS

| 4,672,431 A | * | 6/1987 | Cosgrove | .................... 348/253 |
|---|---|---|---|---|
| 4,975,726 A | * | 12/1990 | Kuga et al. | .................. 396/101 |
| 4,985,777 A | * | 1/1991 | Kawada | ...................... 348/356 |
| 5,212,516 A | * | 5/1993 | Yamada et al. | ............. 348/354 |
| 5,212,557 A | * | 5/1993 | Ueda | ........................... 348/347 |
| 5,337,084 A | * | 8/1994 | Nakamura | .................. 348/345 |
| 5,784,104 A | * | 7/1998 | Arai | ........................... 348/353 |

FOREIGN PATENT DOCUMENTS

| JP | 3-131807 | 6/1991 | ........... G02B/7/34 |
|---|---|---|---|
| JP | 4-289810 | 10/1992 | ........... G02B/7/36 |
| JP | 5-199443 | 8/1993 | .......... H04N/5/232 |
| JP | 6-121332 | 4/1994 | ........... H04N/9/64 |
| JP | 6-178186 | 6/1994 | .......... H04N/5/232 |
| JP | 6-197364 | 7/1994 | ........... H04N/9/68 |
| JP | 7-288733 | 10/1995 | .......... H04N/5/232 |

* cited by examiner

Primary Examiner—Ngoc-Yen Vu
(74) Attorney, Agent, or Firm—Frommer Lawrence & Haug LLP; William S. Frommer (57) ABSTRACT

A luminance signal is extracted from an image pickup signal photographed by a solid state image pickup device and at least a high frequency component in the extracted luminance signal is extracted by a filter. A gain of at least the high frequency component in the luminance signal extracted by a filter is varied. The luminance signal from a luminance signal extracting unit and at least the high frequency component in the luminance signal in which the gain has been varied by a gain control unit are added, thereby emphasizing an edge portion. A focusing lens is driven on the basis of the level of at least the high frequency component in the luminance signal extracted by the filter, thereby controlling an in-focus point.

6 Claims, 7 Drawing Sheets

IMAGE PICKUP APPARATUS HAVING A COMMON CIRCUIT PORTION FOR AUTOFOCUSING AND OUTLINE EMPHAZISING CIRCUITS

TECHNICAL FIELD

The invention relates to an image pickup apparatus and a signal processing method which are suitable for use in a video camera for recording a video signal based on an image pickup signal photographed by an image pickup device onto a recording medium such as magnetic tape, optical disc, or the like and, more particularly, to an automatic focusing control.

BACKGROUND ART

A video camera for recording a video signal based on an image pickup-signal from a CCD (Charge Coupled Device) image pickup device onto a magnetic tape has been widespread. Recently, a digital video camera for recording a digital video signal based on an image pickup signal from the CCD image pickup device onto a magnetic disk, an optical disk, a semiconductor memory, or the like has been put into practical use. An automatic focusing function for controlling a focusing lens to an in-focus point is provided for such a video camera.

Figure 1:
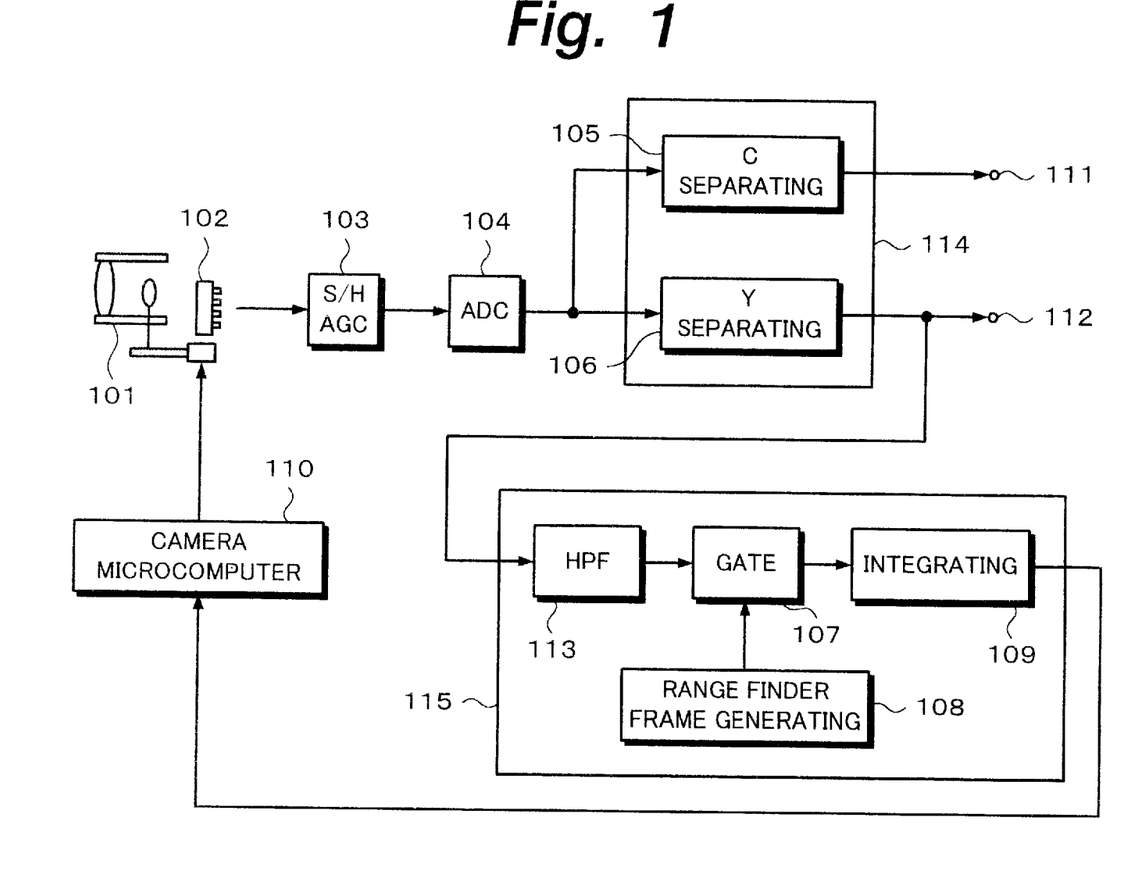
FIG. 1 is a block diagram for use in explanation of a conventional image pickup apparatus.

FIG. 1 shows a construction of a main portion regarding the automatic focusing function of a conventional video camera. The automatic focusing function uses what is called a contrast detecting method for performing a focusing control by using the principle in which a high frequency component of a luminance signal becomes maximum at the in-focus point.

In FIG. 1, reference numeral 101 denotes a lens portion. The lens portion 101 has: a lens group comprising a zoom lens, a focusing lens, and the like; an aperture mechanism; its driving circuit; and the like. An image pickup unit is constructed by the lens portion 101 and a CCD image pickup device 102. A position of the focusing lens in the lens portion 101 is controlled by control information from a microcomputer 110.

Object image light derived via the lens portion 101 is formed as an image onto the image pickup surface of the CCD image pickup device 102 and the object image light is photoelectrically converted. An output of the CCD image pickup device 102 is supplied to a sample/hold and AGC (Automatic Gain Control) circuit 103. An output of the CCD image pickup device 102 is sampled and held and amplified to a proper level by the sample/hold and AGC circuit 103.

An output of the sample/hold and AGC circuit 103 is supplied to an A/D converting circuit 104. In the A/D converting circuit 104, the image pickup signal is digitized. An output of the A/D converting circuit 104 is supplied to each of a chroma signal separating circuit 105 and a luminance signal separating circuit 106 of a camera signal processing circuit 114. In the chroma signal separating circuit 105, a chroma signal is separated and this chroma signal is taken out from an output terminal 111. In the luminance signal separating circuit 106, a luminance signal is separated and this luminance signal is taken out from an output terminal 112.

An automatic focus detecting circuit 115 is constructed by a high pass filter 113, a gate circuit 107, a range finder frame generating circuit 108, and an integrating circuit 109. The luminance signal separated by the luminance signal separating circuit 106 is supplied to the high pass filter 113. A high frequency component in the luminance signal is extracted by the high pass filter 113. A high frequency component level of the luminance signal is detected. An output of the high pass filter 113 is supplied to the gate circuit 107. A window signal for setting a range finder frame is supplied to the gate circuit 107 from the range finder frame generating circuit 108. A detection output at a predetermined timing corresponding to the range finder frame is taken out by the gate circuit 107. An output of the gate circuit 107 is supplied to the integrating circuit 109. In the integrating circuit 109, the high frequency component level of the luminance signal is integrated and an evaluation value is obtained. This evaluation value is supplied to the microcomputer 110.

The microcomputer 110 fetches the evaluation value while moving the focusing lens of the lens portion 101 and controls the focusing lens to the in-focus position on the basis of the evaluation value. That is, the high frequency component level of the luminance signal becomes maximum at the in-focus position. Therefore, while wobbling the focusing lens back and forth at a predetermined low frequency by the microcomputer 110, a point where the evaluation value becomes maximum is searched. This point where the evaluation value becomes maximum is set to the in-focus point of the focusing lens.

As mentioned above, in the conventional video camera, the automatic focus detecting circuit 115 is constructed by the high pass filter 113, gate circuit 107, range finder frame generating circuit 108, and integrating circuit 109. The evaluation value obtained from the automatic focus detecting circuit 115 is supplied to the microcomputer 110. The position of the focusing lens is controlled by the microcomputer 110 on the basis of the evaluation value. The automatic focus detecting circuit 115 of such a conventional video camera has such a problem that a circuit scale is large because the high pass filter 113 and integrating circuit 109 exist.

Particularly, in the conventional video camera, the camera signal processing circuit 114 and automatic focus detecting circuit 115 are arranged on separate circuit boards. In such a separate construction, however, the circuit scale enlarges and an electric power consumption increases. It is, therefore, considered to arrange the camera signal processing circuit 114 and automatic focus detecting circuit 115 onto a same circuit board. In case of such an integrated structure, it is demanded to reduce the circuit scale in order to further decrease the gate scale.

It is, therefore, an object of the invention to provide an image pickup apparatus and a signal processing method which can solve the above problems.

DISCLOSURE OF INVENTION

To solve the above problems, according to the invention, there is provided an image pickup apparatus comprising: a luminance signal extracting unit for extracting a luminance signal from an image pickup signal photographed by a solid state image pickup device; a filter for extracting at least a high frequency component in the luminance signal extracted by the luminance signal extracting unit; a gain control unit for varying a gain of at least the high frequency component in the luminance signal extracted by the filter; an outline emphasizing unit for emphasizing an edge portion by adding the luminance signal from the luminance signal extracting unit and at least the high frequency component in the luminance signal in which the gain has been varied by the gain control unit; and a control unit for controlling an in-focus point by driving a focusing lens on the basis of a level of at least the high frequency component in the luminance signal extracted by the filter, wherein the image pickup signal photographed by the solid state image pickup device is processed.

BEST MODE FOR CARRYING OUT THE INVENTION

An embodiment of the invention will now be described hereinbelow with reference to the drawings. In the embodiment of the invention, a circuit scale is reduced by sharing circuit portions which can be used in common by a camera signal processing circuit and a detecting circuit of an automatic focusing control.

That is, an outline emphasizing circuit for clarifying an edge portion of a picture plane is provided for the camera signal processing circuit. According to the outline emphasizing circuit, a high frequency component in the luminance signal is extracted, the high frequency component in the luminance signal is multiplied by a proper gain, and the high frequency component in the luminance signal multiplied by the proper gain is added to a luminance signal of a main line, thereby emphasizing an outline of the picture plane. Therefore, a band pass filter for extracting the high frequency component in the luminance signal is provided for the outline emphasizing circuit.

According to the automatic focusing control of the contrast detecting method, the high frequency component in the luminance signal is extracted, the high frequency component level of the video signal is integrated within a predetermined range finder frame, an evaluation value is obtained, and the position of the focusing lens is controlled so that the evaluation value becomes maximum. Therefore, a band pass filter for extracting the high frequency component in the luminance signal is provided for the detecting circuit of the automatic focusing control circuit of the contrast detecting method.

Figure 2:
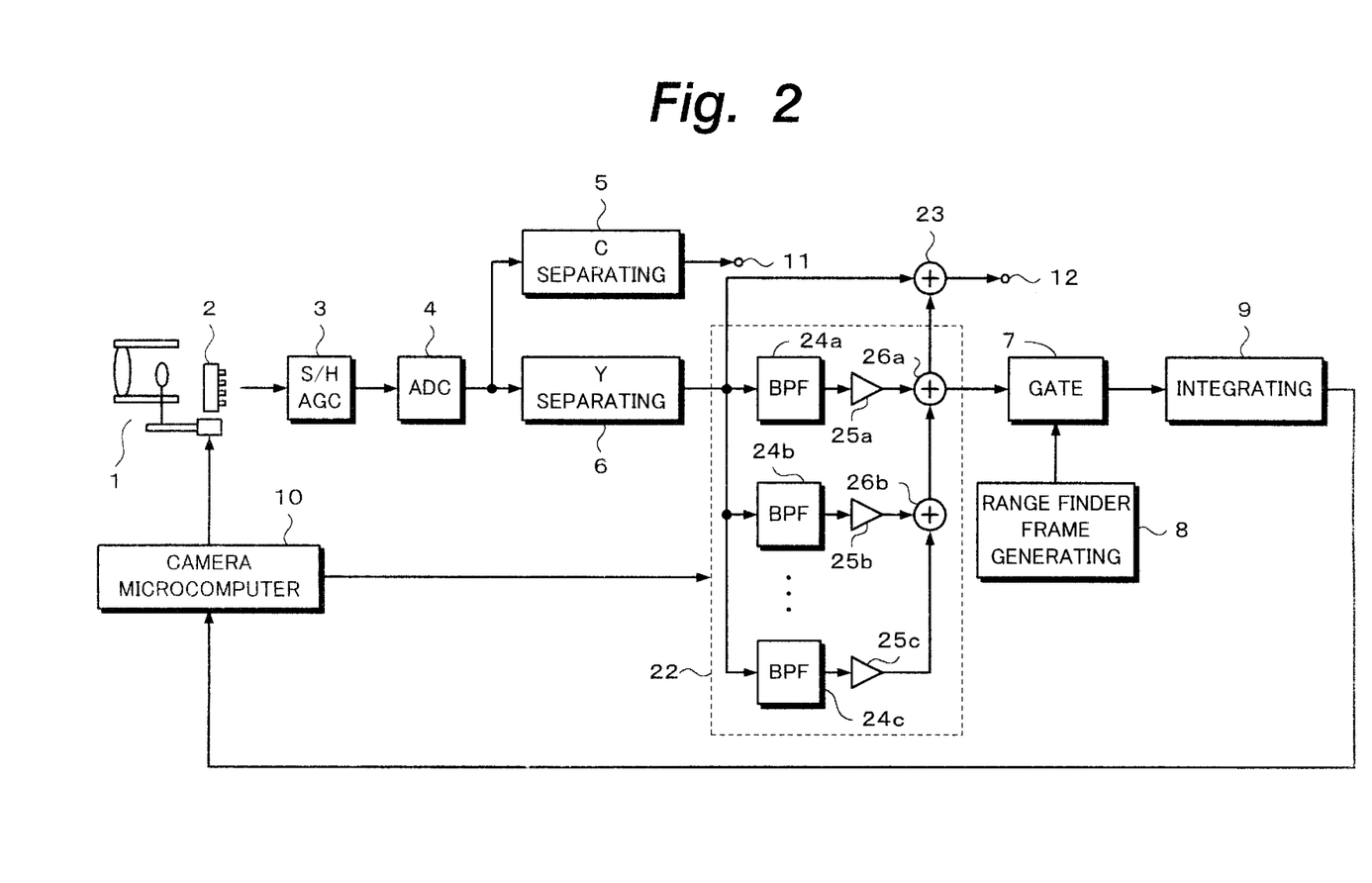
FIG. 2 is a block diagram for explaining an outline of an embodiment of the invention.

As mentioned above, the band pass filter for extracting the high frequency component in the luminance signal is provided for the outline emphasizing circuit of the camera signal processing circuit, and the band pass filter for extracting the high frequency component in the luminance signal is also provided for the detecting circuit of the automatic focusing control circuit. In the case where the camera signal processing circuit and the detecting circuit of the automatic focusing control are arranged on the same circuit board, the filter can be easily shared. As shown in FIG. 2, therefore, it is considered to share the band pass filter of the outline emphasizing circuit of the camera signal processing circuit and the band pass filter of the detecting circuit of the automatic focusing control.

That is, in FIG. 2, a lens portion 1 has: a lens group comprising a zoom lens, a focusing lens, and the like; an aperture mechanism; its driving circuit; and the like. A position of a focusing lens provided in the lens portion 1 is controlled by control information from a microcomputer 10. Object image light derived via the lens portion 1 is formed as an image onto the image pickup surface of a CCD image pickup device 2 and the object image light is photoelectrically converted. An output of the CCD image pickup device 2 is supplied to a sample/hold and AGC circuit 3. The output of the CCD image pickup device 2 is sampled and held and amplified to a proper level by the sample/hold and AGC circuit 3.

An output of the sample/hold and AGC circuit 3 is supplied to an A/D converting circuit 4. An output of the A/D converting circuit 4 is supplied to each of a chroma signal separating circuit 5 and a luminance signal separating circuit 6. In the chroma signal separating circuit 5, a chroma signal is separated and this chroma signal is taken out from an output terminal 11. In the luminance signal separating circuit 6, a luminance signal is separated. An output of the luminance signal separating circuit 6 is supplied to an adding circuit 23 and supplied to band pass filters 24a, 24b, . . . of a signal processing circuit 22.

The signal processing circuit 22 extracts the high frequency component in the luminance signal based on the image pickup signal from the CCD image pickup device 2. The signal processing circuit 22 has: band pass filters 24a, 24b, . . . having different band pass characteristics; gain control amplifiers 25a, 25b, . . . ; and adders 26a, 26b, . . . , respectively.

An output of the luminance signal separating circuit 6 is supplied to the band pass filters 24a, 24b, . . . . The high frequency components in the luminance signal are extracted by the band pass filters 24a, 24b, . . . . Outputs of the band pass filters 24a, 24b, . . . are supplied to the gain control amplifiers 25a, 25b, . . . Outputs of the gain control amplifiers 25a, 25b, . . . are added by the adders 26a, 26b, . . .

As mentioned above, in the signal processing circuit 22, the predetermined high frequency components in the luminance signal are extracted from the outputs of the band pass filters 24a, 24b, . . . The high frequency components are multiplied by predetermined gains by the gain control amplifiers 25a, 25b, . . . An addition value of the high frequency components multiplied by the predetermined gains is outputted from the adder 26a of the signal processing circuit 22.

An output of the adder 26a is supplied to the adding circuit 23. In the adding circuit 23, the luminance signal of the main line from the luminance signal separating circuit 6 and the high frequency components in the luminance signal which were multiplied by predetermined gains from the signal processing circuit 22 are added. By adding the luminance signal of the main line and the high frequency components in the luminance signal which were multiplied by the predetermined gains as mentioned above, an outline is emphasized. Characteristics and intensity of the outline emphasis are set by controlling the gain control amplifiers 25a, 25b, . . . The outline emphasized luminance signal is taken out from an output terminal 12.

The high frequency component in the luminance signal from the signal processing circuit 22 is supplied to a gate circuit 7. A window signal from a range finder frame generating circuit 8 is supplied to the gate circuit 7. A signal in a predetermined range finder frame is extracted by the gate circuit 7. An output of the gate circuit 7 is supplied to an integrating circuit 9. A level of the high frequency component in the luminance signal in the predetermined range finder frame is integrated by the integrating circuit 9. An output of the integrating circuit 9 is supplied as an evaluation value to the microcomputer 10.

The microcomputer 10 fetches the evaluation value from the integrating circuit 9 while moving the focusing lens of the lens portion 1, determines that a point where the evaluation value becomes maximum is an in-focus point, and controls the position of the focusing lens.

As mentioned above, in the above example, the band pass filters 24a, 24b, . . . are used for emphasizing the outline and also used for detecting the evaluation value of the automatic focusing control. Since the band pass filters 24a, 24b, . . . for extracting the high frequency components in the luminance signal are shared in the outline emphasis and the automatic focusing control, the circuit scale can be reduced.

Figure 3:
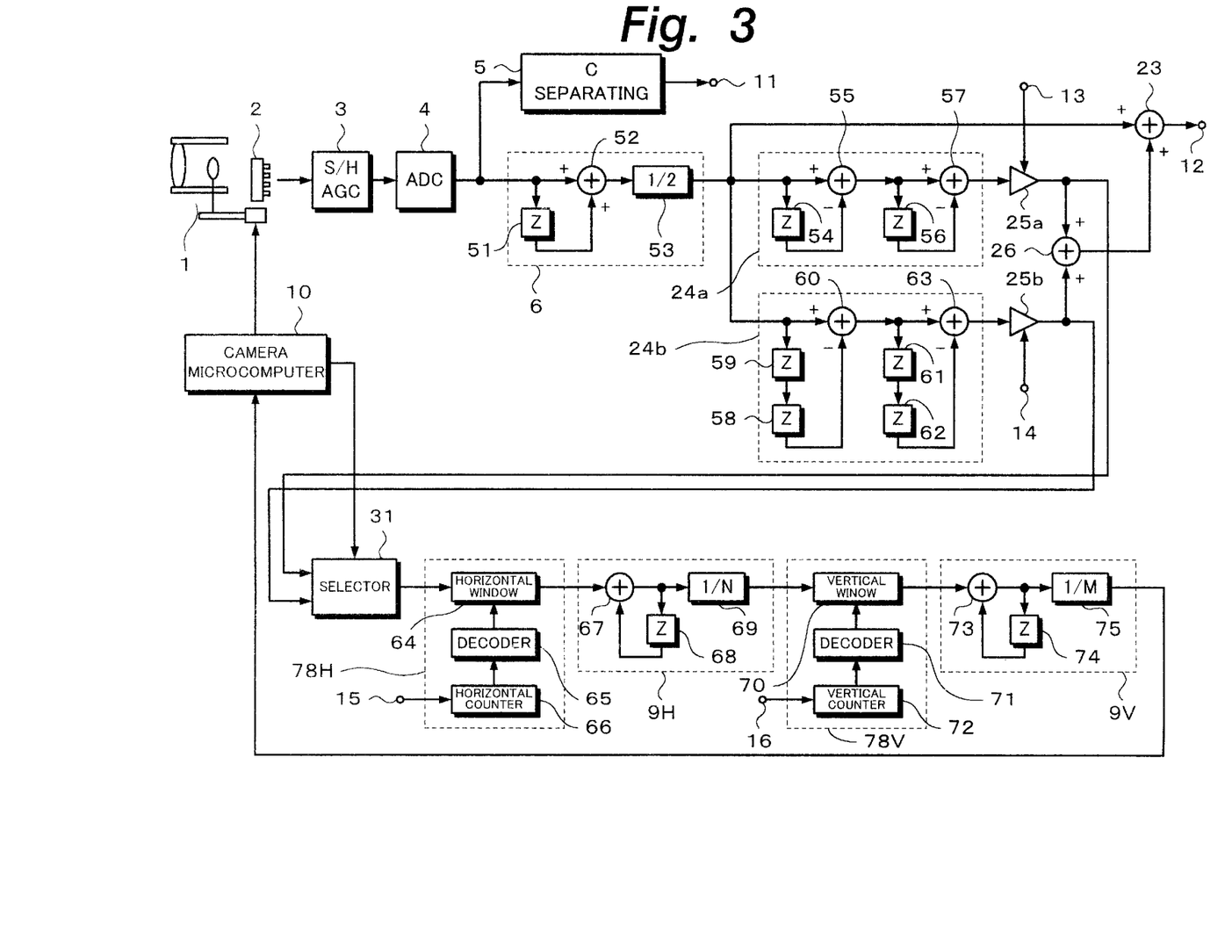
FIG. 3 is a block diagram showing an image pickup apparatus in the embodiment.

FIG. 3 shows an embodiment for reducing the circuit scale by sharing the filter for extracting the high frequency component in the luminance signal in the outline emphasis and the automatic focusing control as mentioned above. This example is constructed by providing two band pass filters as band pass filters 24a, 24b, . . . in the signal processing circuit 22 in FIG. 2 mentioned above. Portions corresponding to those in FIG. 2 mentioned above are designated by the same reference numerals.

In FIG. 3, reference numeral 1 denotes the lens portion. The lens portion 1 has: a zoom lens; a focusing lens; an aperture mechanism; its driving circuit; and the like. An image pickup unit is constructed by the lens portion 1 and CCD image pickup device 2.

Figure 4:
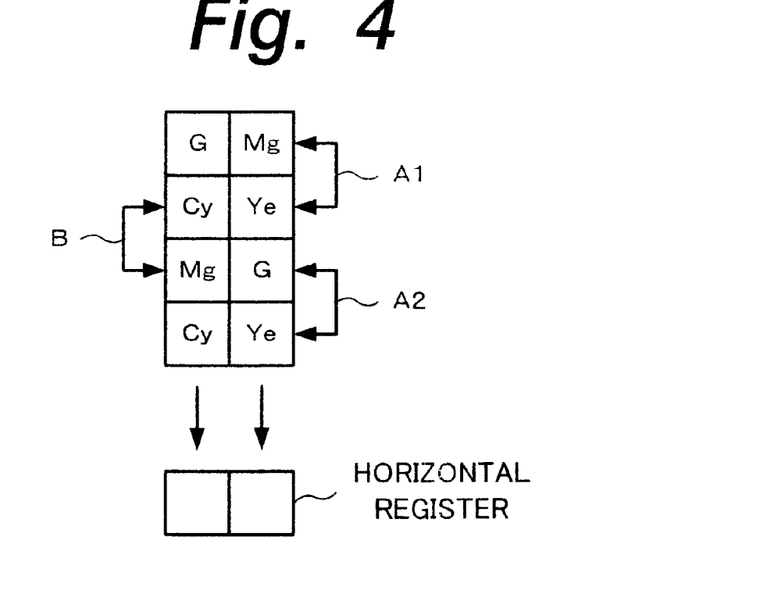
FIG. 4 is a diagram for use in explanation of a pixel array in the embodiment.

Color filters subjected to a color coding called, for example, a (2×4) complementary checkered coding with a predetermined relation are arranged on the CCD image pickup device 2. FIG. 4 schematically shows the color filters subjected to the (2×4) complementary checkered coding. In FIG. 4, reference character G denotes green, Mg indicates magenta, Cy indicates cyan, and Ye indicates yellow.

In the CCD image pickup device 2, for example, in the odd field, charges are mixed by combinations shown at A1 and A2 in FIG. 4 and, in the even field, charges are mixed by a combination shown at B in FIG. 4. Thus, when attention is paid to an A1 line, a mixture signal is outputted from a horizontal register in order of (G+Cy)→(Mg+Ye). When attention is paid to an A2 line, a mixture signal is outputted from the horizontal register in order of (Mg+Cy)→(G+Ye). When attention is paid to a B line, a mixture signal is outputted in order of (Cy+Mg)→(Ye+G).

In FIG. 3, the output of the CCD image pickup device 2 is supplied to the sample/hold and AGC circuit 3. In the sample/hold and AGC circuit 3, the output of the CCD image pickup device 2 is sampled and held and amplified to a proper level. An output of the sample/hold and AGC circuit 3 is supplied to the A/D converting circuit 4.

In the A/D converting circuit 4, the output of the CCD image pickup device 2 is digitized at a rate of 10 bits per sample by a sampling frequency of, for example, 4 fsc (fsc is a color subcarrier frequency). An output of the A/D converting circuit 4 is supplied to each of the chroma signal separating circuit 5 and luminance signal separating circuit 6.

The luminance signal separating circuit 6 is constructed by a delay circuit 51, an adder 52, and a ½ multiplier 53. The output of the A/D converting circuit 4 is supplied to the adder 52 and also supplied to the adder 52 via the delay circuit 51. A transfer function of the luminance signal separating circuit 6 is expressed by $$H(z)=1+z^{-1}$$

and has a construction of a trap filter.

As mentioned above, the luminance signal separating circuit 6 has a construction in which the image pickup signal from the CCD image pickup device 2 and the image pickup signal from the CCD image pickup device 2 which was delayed by the delay circuit 51 are added by the adder 52. For example, when the adjacent pixels are added by paying attention to the A1 line, the following equation is obtained due to the array relation of the color filters in FIG. 3 mentioned above.

$$Y=((G+Cy)+(Mg+Ye))/2=(2B+3G+2R)/2$$

When the adjacent pixels are added by paying attention to the A2 line, the following equation is obtained.

$$Y=((Mg+Cy)+(G+Ye))/2=(2B+3G+2R)/2$$

The above point is also similarly applied to the B field and Y=(2B+3G+2R)/2 is obtained and the same result can be obtained in all portions. This means that the luminance signal is separated by adding the adjacent pixels.

In the luminance signal separating circuit 6, by adding the adjacent pixels, the luminance signal is extracted as mentioned above. The luminance signal separated by the luminance signal separating circuit 6 is supplied to the adding circuit 23 and supplied to the band pass filters 24a and 24b.

The band pass filter 24a comprises two delay circuits 54 and 56 and two subtractors 55 and 57. The luminance signal from the luminance signal separating circuit 6 is supplied to the subtractor 55 and also supplied to the subtractor 55 via the delay circuit 54. An output of the subtractor 55 is supplied to the subtractor 57 and also supplied to the subtractor 57 via the delay circuit 56. A transfer function of the band pass filter 24a is expressed by $$H1(z)=(1-z^{-1})^2$$

The band pass filter 24b comprises four delay circuits 58, 59, 61, and 62 and two subtractors 60 and 63. The luminance signal from the luminance signal separating circuit 6 is supplied to the subtractor 60 and also supplied to the subtractor 60 via the delay circuits 58 and 59. An output of the subtractor 60 is supplied to the subtractor 63 and also supplied to the subtractor 63 via the delay circuits 61 and 62. A transfer function of the band pass filter 24b is expressed by $$H2(z)=(1-z^{-2})^2$$

Figure 5:
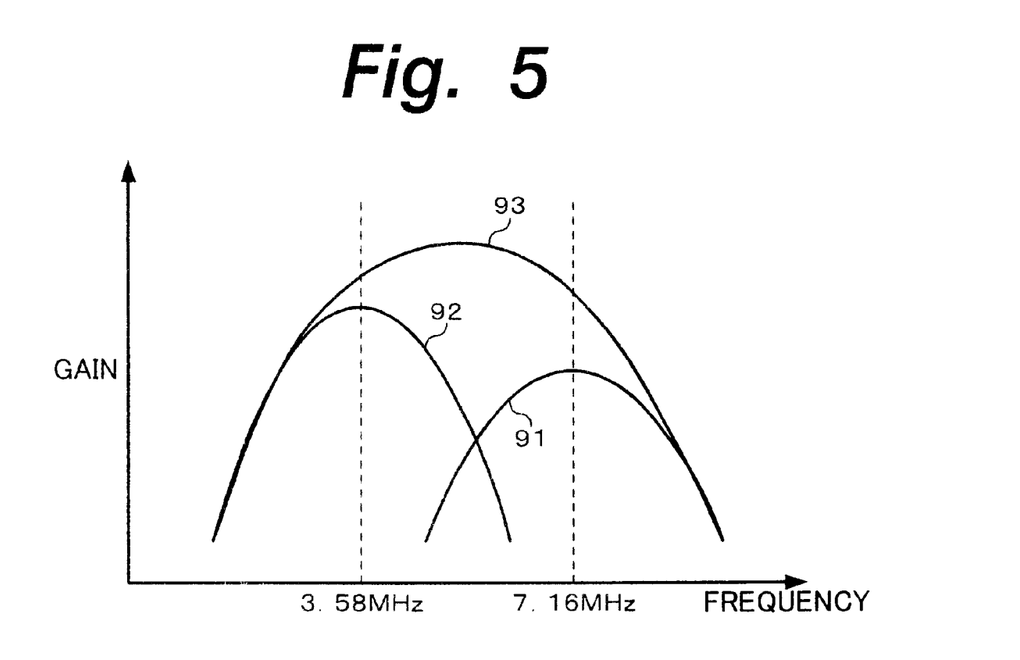
FIG. 5 is a diagram showing band pass characteristics of a band pass filter in the image pickup apparatus in the embodiment.

FIG. 5 shows band pass characteristics of the foregoing two band pass filters 24a and 24b. In FIG. 5, a solid line 91 shows band pass characteristics of the band pass filter 24a. When the sampling frequency is equal to 4 fsc, a center frequency is equal to 7.16 MHz. In FIG. 5, a solid line 92 shows band pass characteristics of the band pass filter 24b. When the sampling frequency is equal to 4 fsc, a center frequency is equal to 3.58 MHz. A solid line 93 shows synthetic characteristics of those characteristics.

In FIG. 3, an output of the band pass filter 24a is supplied to the gain control amplifier 25a. A gain of the gain control amplifier 25a is set by a control signal which is supplied to a control terminal 13. An output of the gain control amplifier 25a is supplied to an adder 26.

An output of the band pass filter 24b is supplied to the gain control amplifier 25b. A gain of the gain control amplifier 25b is set by a control signal which is supplied to a control terminal 14. An output of the gain control amplifier 25b is supplied to the adder 26. An addition value of the high frequency components in the luminance signal which were multiplied by the predetermined gains is outputted from the adder 26.

An output of the adder 26 is supplied to the adding circuit 23. In the adding circuit 23, the luminance signal of the main line from the luminance signal separating circuit 6 and the high frequency components in the luminance signal which were extracted by the band pass filters 24a and 24b and multiplied by predetermined gains by the gain control amplifiers 25a and 25b are added. By adding the luminance signal of the main line and the high frequency components in the luminance signal which were multiplied by the predetermined gains, an outline is emphasized. Characteristics and intensity of the outline emphasis are set by controlling the gain control amplifiers 25a, 25b, . . . The outline emphasized luminance signal is taken out from the output terminal 12.

An output of the gain control amplifier 25a and an output of the gain control amplifier 25b are supplied to a selector 31. The selector 31 is switched by the microcomputer 10 for a camera. An output of the selector 31 is supplied to a horizontal side gate circuit 78H.

The horizontal side gate circuit 78H is provided to set a range finder frame in the horizontal direction and comprises a horizontal window circuit 64, a decoder 65, and a horizontal counter 66. A sampling clock is supplied to the horizontal counter 66 from a terminal 15. The number of addresses in the horizontal direction is counted by the horizontal counter 66. An output of the horizontal counter 66 is supplied to the decoder 65. A window signal is formed by the decoder 65 at a timing corresponding to the address in the range finder frame in the horizontal direction. The window signal is supplied to the horizontal window circuit 64. The signal in the range finder frame in the horizontal direction is extracted by the horizontal window circuit 64 in response to the window signal from the decoder 65.

An output of the horizontal side gate circuit 78H is supplied to a horizontal direction integrating circuit 9H. The horizontal direction integrating circuit 9H comprises an adder 67, a delay circuit 68, and a 1/N multiplier 69. An output of the horizontal side gate circuit 78H is supplied to the adder 67. An output of the adder 67 is supplied to the 1/N multiplier 69 and also supplied to the adder 67 via the delay circuit 68. The level of the high frequency component in the luminance signal in the range finder frame in the horizontal direction is integrated by the horizontal direction integrating circuit 9H.

An output of the horizontal direction integrating circuit 9H is supplied to a vertical side gate circuit 78V. The vertical side gate circuit 78V comprises a vertical window circuit 70, a decoder 71, and a vertical counter 72. A horizontal clock is supplied to the vertical counter 72 from a terminal 16. The number of addresses in the vertical direction is counted by the vertical counter 72. An output of the vertical counter 72 is supplied to the decoder 71. A window signal is formed by the decoder 71 at a timing corresponding to the address in the range finder frame in the vertical direction. The window signal is supplied to the vertical window circuit 70. The signal in the range finder frame in the vertical direction is extracted by the vertical window circuit 70 in response to the window signal from the decoder 71.

An output of the vertical side gate circuit 78V is supplied to a vertical direction integrating circuit 9V. The vertical direction integrating circuit 9V comprises an adder 73, a delay circuit 74, and a 1/M multiplier 75. An output of the vertical side gate circuit 78V is supplied to the adder 73. An output of the adder 73 is supplied to the 1/M multiplier 75 and also supplied to the adder 73 via the delay circuit 74. The level of the high frequency component in the luminance signal in the range finder frame in the vertical direction is integrated by the vertical direction integrating circuit 9V.

An output of the 1/M multiplier 75 is supplied as an evaluation value to the microcomputer 10. The microcomputer 10 fetches the evaluation value from the integrating circuit 9 while moving the focusing lens of the lens portion 1, determines that a point where the evaluation value becomes maximum is an in-focus point, and controls the position of the focusing lens.

Figure 6A:
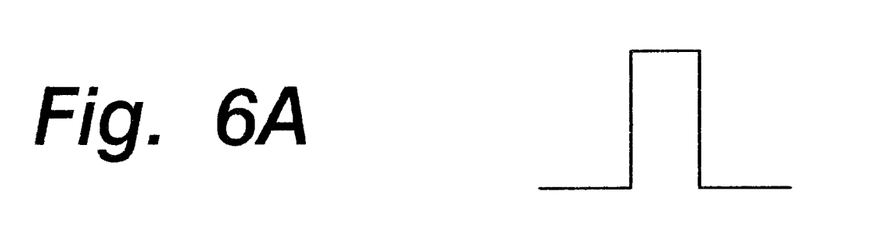
FIG. 6A is a diagram showing a luminance signal waveform in an in-focus state in the image pickup apparatus in the embodiment.
Figure 6B:
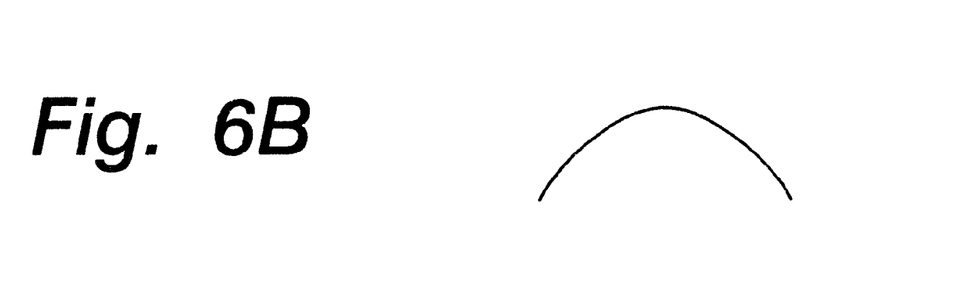
FIG. 6B is a diagram showing frequency characteristics of the signal in FIG. 6A.
Figure 6C:
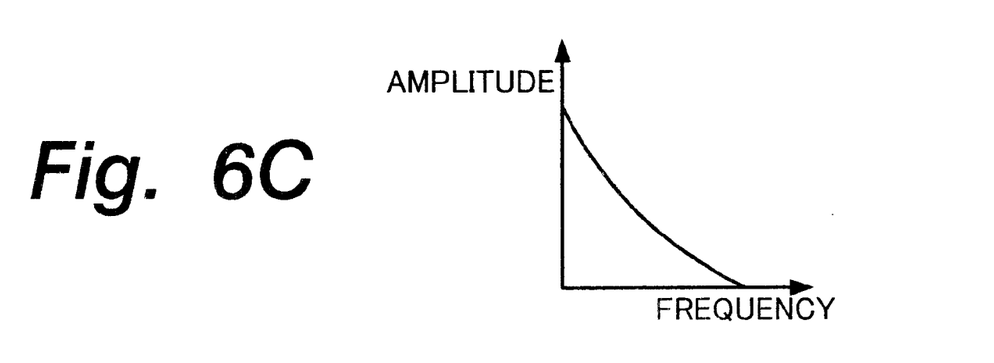
FIG. 6C is a diagram showing luminance signal characteristics in an out-of-focus state in the image pickup apparatus in the embodiment.
Figure 6D:
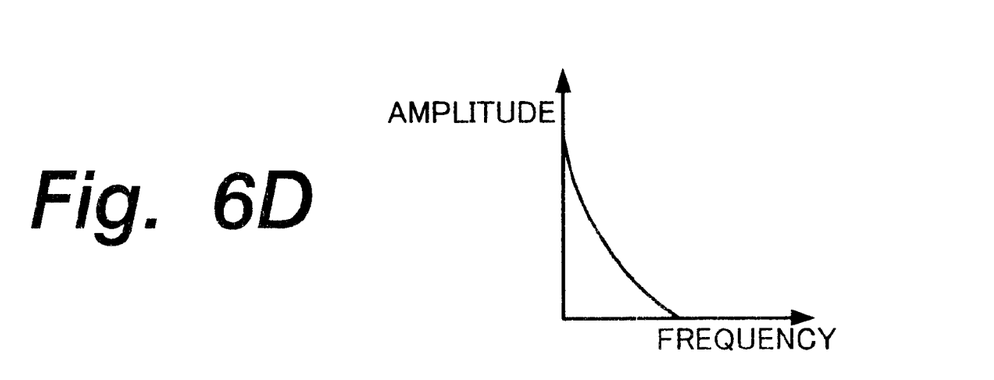
FIG. 6D is a diagram showing a frequency component of the signal in FIG. 6C.

That is, since the outline of the object image is clearly displayed at the in-focus position, as shown in FIG. 6A, an amount of edge portions increases in the luminance signal. Such frequency components in the luminance signal contain many high frequencies as shown in FIG. 6B. When the focusing lens is in the out-of-focus state, the outline of the object image is obscure and no edge portion is contained in the luminance signal as shown in FIG. 6C. Such frequency components in the luminance signal do not contain any high frequency as shown in FIG. 6D. Consequently, the focusing lens can be controlled to the in-focus position by extracting the high frequency component level in the luminance signal, integrating the high frequency component level in the luminance signal, and obtaining the evaluation value.

In this instance, first, in FIG. 3, a control at two stages in which the focusing lens of the lens portion 1 is driven while being wobbled back and forth at a predetermined low frequency and the in-focus point direction is determined and, thereafter, the focusing lens is further accurately controlled to the in-focus position is executed. At the first discriminating stage of the in-focus point, the selector 31 is set so that the evaluation value is obtained from the high frequency component level in the luminance signal extracted by the band pass filter 24b of a low band pass frequency. When the microcomputer 10 determines that the focusing lens is in a state that is close to the in-focus point to a certain extent, the selector 31 is set so that the evaluation value is obtained from the high frequency component level in the luminance signal extracted by the band pass filter 24a of a high band pass frequency. The microcomputer 10 fetches the evaluation value while wobbling the focusing lens of the lens portion 1 and controls the position of the focusing lens so that the evaluation value becomes maximum.

As mentioned above, the control for moving the focusing lens to the in-focus point by the microcomputer 10 is executed at two stages. This is because when the focusing lens is far from the in-focus point, since an amount of very high frequency components in the luminance signal is small, if the evaluation value obtained from the band pass filter 24a of the high pass band is used at the first stage, the microcomputer 10 cannot determine the in-focus direction. If the evaluation value derived from the level of the high frequency component in the luminance signal extracted by the band pass filter 24b of a low pass band is obtained, even if the focusing lens is far from the in-focus point, the microcomputer 10 can certainly determine the in-focus direction. As mentioned above, after the microcomputer 10 allowed the focusing lens into the in-focus state to a certain degree by using the evaluation value derived from the level of the high frequency component in the luminance signal extracted by the band pass filter 24b of the low pass band, by controlling the position of the focusing lens on the basis of the evaluation value derived from the level of the high frequency component in the luminance signal extracted by the band pass filter 24a of the high pass band, the focusing lens can be precisely located to the in-focus position.

Figure 7:
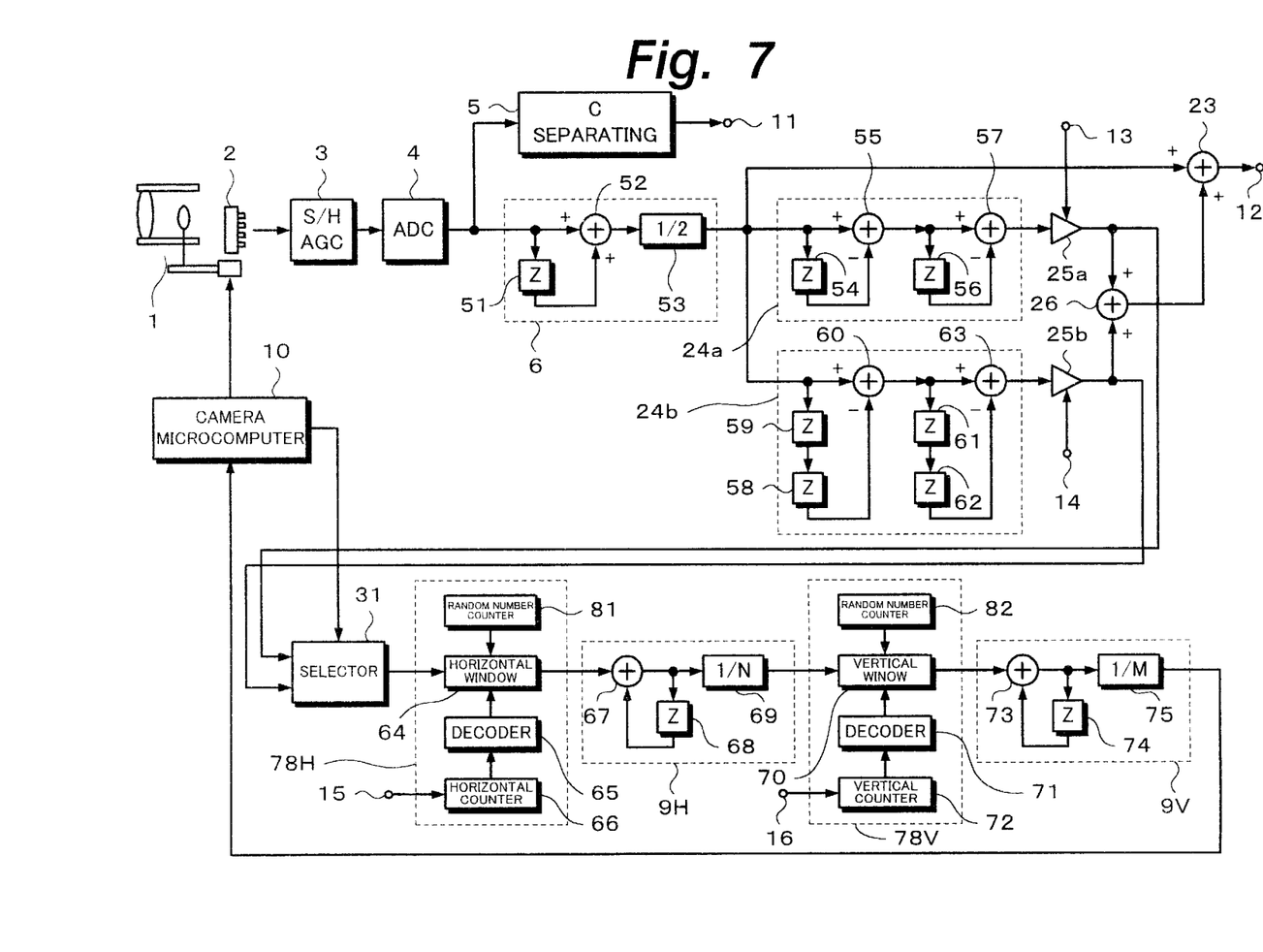
FIG. 7 is a block diagram showing an image pickup apparatus in another embodiment.

FIG. 7 shows a whole construction of another embodiment of the invention. According to another embodiment shown in FIG. 7, the number of samples which are used in case of obtaining the evaluation value in the embodiment of FIG. 3 is reduced, thereby decreasing the circuit scale.

In another embodiment shown in FIG. 7, a random number counter 81 is provided for the horizontal side gate circuit 78H and a random number counter 82 is provided for the vertical side gate circuit 78V. The random number counter 81 generates random numbers by addresses in the range finder frame in the horizontal direction. The random number counter 82 generates random numbers by addresses in the range finder frame in the vertical direction. For example, M series are used to generate the random numbers.

The window signal is generated from the decoder 65 at the timing of the range finder frame in the horizontal direction. The random numbers are generated from the random number counter 81 by the addresses in the range finder frame in the horizontal direction. In the horizontal window circuit 64, each sample of the high frequency component in the luminance signal is extracted at the timing of the range finder frame in the horizontal direction from the decoder 65. Among all samples of the high frequency component in the luminance signal in the range finder frame in the horizontal direction, the samples based on the random numbers generated from the random number counter 81 are extracted and the other samples are thinned out. Each sample of the high frequency component in the luminance signal in the range finder frame in the horizontal direction which was thinned out at random as mentioned above is supplied to the integrating circuit 9H and integrated.

The window signal is generated from the decoder 71 at the timing of the range finder frame in the vertical direction. The random numbers are generated from the random number counter 82 by the addresses in the range finder frame in the vertical direction. In the vertical window circuit 70, each sample of the high frequency component in the luminance signal is extracted at the timing of the range finder frame in the vertical direction from the decoder 71. Among all samples of the high frequency component in the luminance signal in the range finder frame in the vertical direction, the samples based on the random numbers generated from the random number counter 82 are extracted and the other samples are thinned out. Each sample of the high frequency component in the luminance signal in the range finder frame in the vertical direction which was thinned out at random as mentioned above is supplied to the integrating circuit 9V and integrated.

As mentioned above, in another embodiment of the invention, all samples of the high frequency components in the range finder frame in the horizontal and vertical directions are not used but, for example, the data is decimated into about 1/15 with respect to the horizontal direction and decimated into about 1/5 with respect to the vertical direction. Since the decimation is performed on the basis of the random numbers as mentioned above, the numbers of bits of the integrating circuits 9H and 9V can be reduced and the circuit scale can be reduced. Since the random decimation is performed in the horizontal side gate circuit 78H and vertical side gate circuit 78V, the focusing control can be performed without being influenced by a picture pattern.

Figure 8:
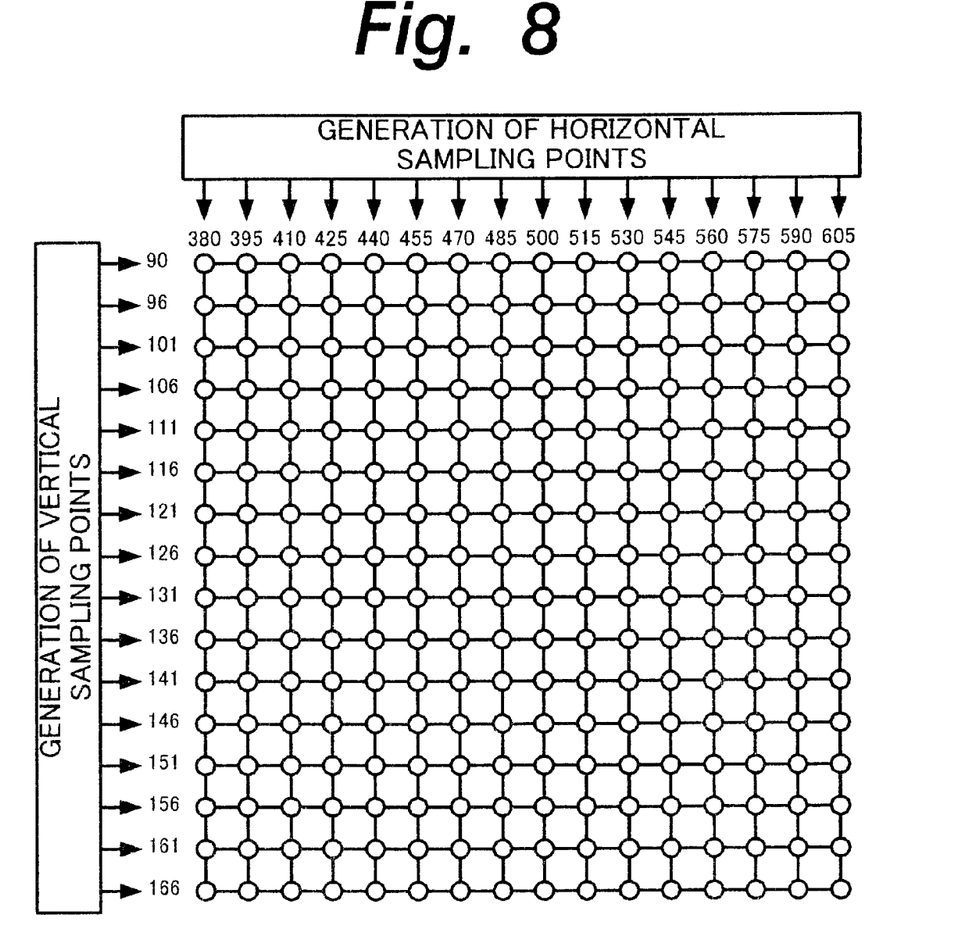
FIG. 8 is a diagram showing a sampling example of the image pickup apparatus in another embodiment.

FIG. 8 shows an example of the range finder frame in this instance. In case of 4 fsc as a sampling frequency in the NTSC system, the number of samples in the horizontal direction is equal to 910 and the number of samples in the vertical direction is equal to 525. Therefore, when the range finder frame is arranged almost at the center of the screen, the addresses of the range finder frame are set, for example, to 380 to 605 in the horizontal direction and to 91 to 166 in the vertical direction.

When the output of the horizontal counter 66 lies within a range from 380 to 605 in correspondence to the range finder frame, the window signal is generated from the decoder 65 in FIG. 7. When the output of the vertical counter 72 lies within a range from 90 to 166 in correspondence to the range finder frame, the window signal is generated from the decoder 71.

The addresses in the horizontal direction are generated at random from the random number counter 81. The data is sampled at the timing when any of the addresses in the horizontal direction generated at random coincides with the address of the horizontal counter 66. The addresses in the vertical direction are generated at random from the random number counter 82. The data is sampled at the timing when any of the addresses in the vertical direction generated at random coincides with the address of the vertical counter 72.

Although another embodiment mentioned above has been described with respect to the case where the random number counters are provided for both horizontal side gate circuit 78H and vertical side gate circuit 78V, the sampling process by the random number counter can be performed only on the horizontal side gate circuit 78H or the sampling process by the random number counter can be also performed only on the vertical side gate circuit 78V.

Although one range finder frame has been used in the foregoing example, a multipoint distance measurement is possible by preparing a plurality of range finder frames. The range finder frame can be freely moved in the picture plane.

According to the invention, one band pass filter is shared as a band pass filter provided as filter means for performing the outline emphasizing process and as a band pass filter for detecting the contrast evaluation value in the automatic focusing control. Therefore, the circuit scale can be reduced. Further, in the invention, the random number counters are used for the process at the time of obtaining the contrast evaluation value and only arbitrary sampling data within a predetermined timing is integrated. Therefore, the contrast evaluation value can be efficiently formed.

Industrial Applicability

The invention is suitable for use in an automatic focusing control and an outline emphasis in a video camera for recording a video signal based on an image pickup signal photographed by an image pickup device onto a recording medium such as magnetic tape, optical disk, or the like.

What is claimed is:

1. An image pickup apparatus comprising:

luminance signal extracting means for extracting a luminance signal from an image pickup signal photographed by a solid state image pickup device;

filter means for extracting at least a high frequency component in said luminance signal extracted by said luminance signal extracting means;

gain control means for varying a gain of at least said high frequency component in said luminance signal extracted by said filter means;

outline emphasizing means for emphasizing an edge portion by adding said luminance signal from said luminance signal extracting means and at least said high frequency component in said luminance signal in which the gain has been varied by said gain control means; and control means for controlling an in-focus point by driving a focusing lens on the basis of a level of at least said high frequency component in the luminance signal extracted by said filter means, wherein the image pickup signal photographed by said solid state image pickup device is processed.

2. An apparatus according to claim 1, wherein said luminance signal extracting means extracts the luminance signal by adding signals corresponding to adjacent pixels by said luminance signal.

3. An apparatus according to claim 1, wherein said control means comprises:

gate means for extracting data of at least said high frequency component in said luminance signal extracted by said filter means in a predetermined range finder frame;

decimating means in the horizontal direction for decimating data in the horizontal direction in said range finder frame on the basis of random numbers; and integrating means for integrating at least said data of the high frequency component in said luminance signal in said predetermined range finder frame which has been decimated by said decimating means in the horizontal direction.

4. An apparatus according to claim 1, wherein said control means comprises:

gate means for extracting data of at least said high frequency component in said luminance signal extracted by said filter means in a predetermined range finder frame;

decimating means in the vertical direction for decimating data in the vertical direction in said range finder frame on the basis of random numbers; and integrating means for integrating at least said data of the high frequency component in said luminance signal in said predetermined range finder frame which has been decimated by said decimating means in the vertical direction.

5. An apparatus according to claim 1, wherein said control means comprises:

gate means for extracting data of at least said high frequency component in said luminance signal extracted by said filter means in a predetermined range finder frame;

decimating means in the horizontal direction for decimating data in the horizontal direction in said range finder frame on the basis of random numbers;

decimating means in the vertical direction for decimating data in the vertical direction in said range finder frame on the basis of random numbers; and integrating means for integrating at least said data of the high frequency components in said luminance signal in said predetermined range finder frame which have been decimated by said decimating means in the horizontal direction and said decimating means in the vertical direction.

6. A signal processing method comprising:

a luminance signal extracting step of extracting a luminance signal from an image pickup signal photographed by a solid state image pickup device;

a filtering step of extracting at least a high frequency component in said luminance signal extracted in said luminance signal extracting step;

a gain control step of varying a gain of at least said high frequency component in said luminance signal extracted in said filtering step;

an outline emphasizing step of emphasizing an edge portion by adding said luminance signal extracted in said luminance signal extracting step and at least said high frequency component in said luminance signal in which the gain has been varied in said gain control step; and a control step of controlling an in-focus point by driving a focusing lens on the basis of a level of at least said high frequency component in said luminance signal extracted in said filtering step, wherein the image pickup signal photographed by said solid state image pickup device is processed.

* * * * *